(12) United States Patent
Yang et al.

(10) Patent No.: US 7,775,380 B2
(45) Date of Patent: Aug. 17, 2010

(54) UTENSIL HOLDING RETAINER BLOCK FOR USE WITH DISH RACK

(75) Inventors: Frank Yang, Rancho Palos Verdes, CA (US); Tzu-Hao Wei, Hacienda Heights, CA (US); Joseph Sandor, Santa Ana Heights, CA (US)

(73) Assignee: Simplehuman LLC, Torrance, CA (US)

( * ) Notice: Subject to any disclaimer, the term of this patent is extended or adjusted under 35 U.S.C. 154(b) by 139 days.

(21) Appl. No.: 11/899,440

(22) Filed: Sep. 5, 2007

(65) Prior Publication Data

US 2008/0023421 A1 Jan. 31, 2008

(51) Int. Cl.
*A47G 21/14* (2006.01)
*B65D 25/10* (2006.01)

(52) U.S. Cl. ............... 211/70.7; 211/41.9; 220/488; 220/528

(58) Field of Classification Search ............ 211/41.8, 211/41.9, 70.7; 220/487, 488, 553, 555, 220/528, 23.89; D32/3; 134/92
See application file for complete search history.

(56) References Cited

U.S. PATENT DOCUMENTS

| | | | |
|---|---|---|---|
| 591,377 A | 10/1897 | Bunce | |
| 1,604,608 A | 10/1926 | Ryerson | |
| 1,682,654 A | 8/1928 | Andrews | |
| D16,417 S | 8/1951 | Planeta | |
| 2,655,267 A | 10/1953 | Planeta | |
| 2,708,037 A | 5/1955 | Planeta | |
| 2,739,715 A | 3/1956 | Planeta | |
| 2,864,509 A | 12/1958 | Watral | |
| 2,885,087 A | 5/1959 | Bliss | |
| 2,886,087 A | 5/1959 | Pasinski | |
| 3,203,557 A | 8/1965 | Ettlinger, Jr. | |
| 3,217,890 A | 11/1965 | Maslow | |
| 3,433,363 A | 3/1969 | Clearman et al. | |
| 3,941,273 A | 3/1976 | Dalencon | |
| 3,960,290 A | 6/1976 | Yake et al. | |
| 4,534,474 A * | 8/1985 | Ng ................... | 211/70.7 |
| 4,635,799 A | 1/1987 | Penner | |
| D306,926 S | 3/1990 | Heller et al. | |
| 4,974,806 A | 12/1990 | Matern | |
| D321,771 S | 11/1991 | Cavichhia | |
| D347,718 S | 6/1994 | Craft et al. | |
| D353,921 S | 12/1994 | Lippisch et al. | |
| 5,431,294 A | 7/1995 | Stottmann et al. | |
| D363,578 S | 10/1995 | Brightbill et al. | |
| D370,323 S | 5/1996 | Lafond | |
| D376,882 S | 12/1996 | Cook | |
| 5,588,539 A | 12/1996 | Belden, Jr. et al. | |
| 5,605,236 A | 2/1997 | Welch | |
| D398,725 S | 9/1998 | Merkel | |
| D408,603 S | 4/1999 | Haley | |
| 6,021,906 A | 2/2000 | Heien | |

(Continued)

FOREIGN PATENT DOCUMENTS

DE 20201103 7/2003

(Continued)

*Primary Examiner*—Michael Safavi
(74) *Attorney, Agent, or Firm*—Liu & Liu

(57) ABSTRACT

A dish rack has a collector tray that has a compartment. A retaining block is seated in the compartment for holding knives or other utensils having sharp edges.

11 Claims, 5 Drawing Sheets

U.S. PATENT DOCUMENTS

| | | |
|---|---|---|
| 6,109,455 A | 8/2000 | Schroeder |
| D439,716 S | 3/2001 | Wright |
| D448,132 S | 9/2001 | Wolfenden |
| 6,364,130 B2 | 4/2002 | Wright |
| 6,364,131 B1 | 4/2002 | Moylan |
| 2002/0185166 A1 | 12/2002 | Rosenbauer et al. |
| 2004/0211737 A1* | 10/2004 | Siegel et al. ............... 211/70.7 |

FOREIGN PATENT DOCUMENTS

| | | |
|---|---|---|
| EP | 0385877 | 8/1993 |
| EP | 1384432 | 1/2004 |
| GB | 724313 | 2/1955 |
| GB | 2363316 | 12/2001 |
| JP | 10328117 | 12/1998 |
| JP | 2001169994 | 6/2001 |

* cited by examiner

UTENSIL HOLDING RETAINER BLOCK FOR USE WITH DISH RACK

BACKGROUND OF THE INVENTION

1. Field of the Invention

The present invention relates to dish racks and their accessories, and in particular, to a retainer block that can be used with the dish rack to protect the user from sharp edges of a sharp object, such as the blade of knives.

2. Description of the Prior Art

Dish racks are commonly used in dishwashers for organizing and positioning plates, bowls, cups and utensils for washing. Dish racks are also commonly used on kitchen countertops for positioning plates, bowls, cups and utensils to let them dry after they have been washed.

Most of the plates, bowls, cups and utensils can be handled by a user without presenting any danger or harm because they do not have sharp or blunt surfaces. However, a potentially dangerous utensil is the knife, whose sharp blades can cut or hurt a user if the user accidentally grabs the knife by the blade. In conventional dish racks, a plastic collector tray is provided for receiving utensils. The collector tray is typically divided into different compartments for receiving different types of utensils (spoons, forks, knives, etc.). These compartments have open tops, so that the user merely inserts the utensil into the compartment. Knives are more troublesome. If the user inserts the knife into an open compartment with the blade facing down, the user can later remove the knife in a safe manner by gripping the handle of the knife. However, inserting the knife in this orientation may blunt the sharp tip or blade of the knife since the tip or blade will contact the walls of the compartment. On the other hand, if the user inserts the knife into an open compartment with the blade facing up, then the knife would pose a severe safety risk to anyone who accidentally attempts to grip the knife without seeing the exposed blade.

Therefore, there still remains a need to provide a safe disposition for knives and sharp objects in a dish rack.

SUMMARY OF THE DISCLOSURE

It is an object of the present invention to provide a safe disposition for knives and sharp objects in a dish rack.

It is another object of the present invention to provide a retainer block that can safely receive and retain a knife or other sharp object in a dish rack.

In order to accomplish the objects of the present invention, the present invention provides a dish rack having a collector tray, the collector tray having a compartment. A retaining block is seated in the compartment for holding knives or other utensils having sharp edges.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
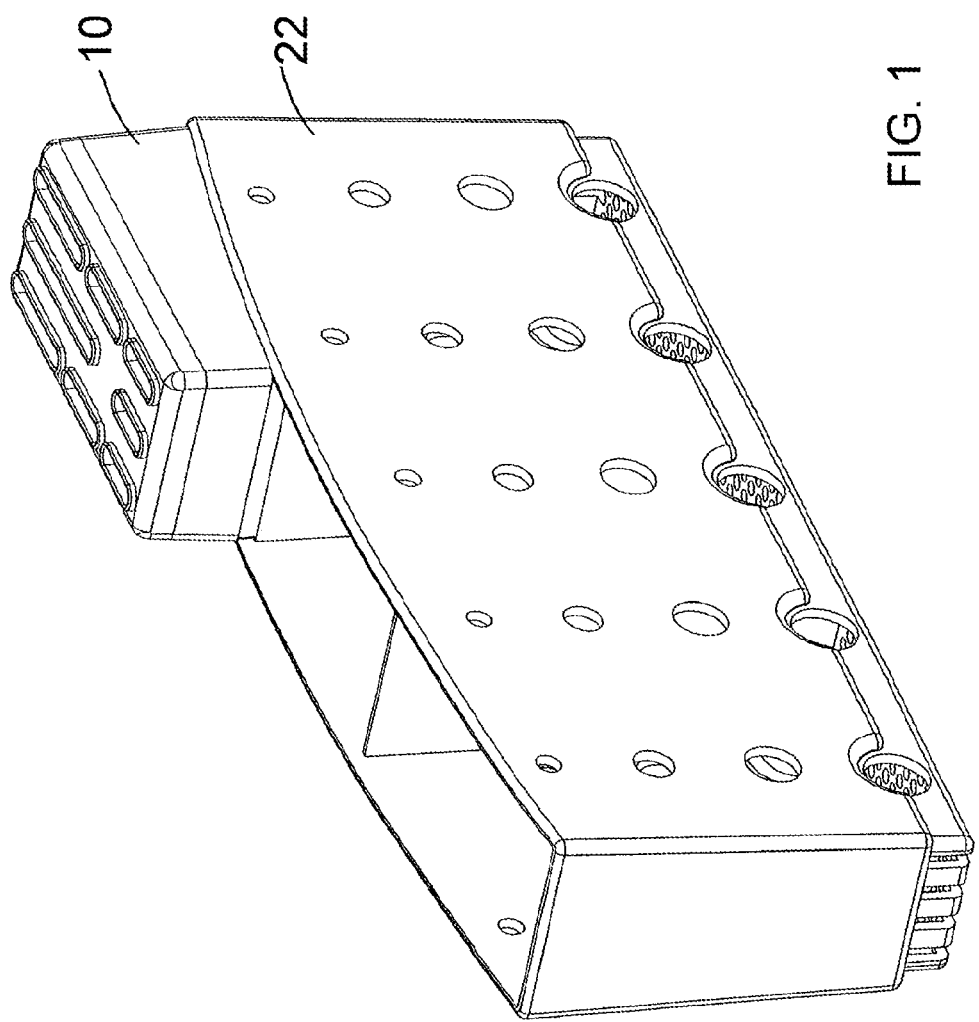
FIG. 1 is a perspective view of a collector tray and a retainer block according to one embodiment of the present invention.
Figure 2:
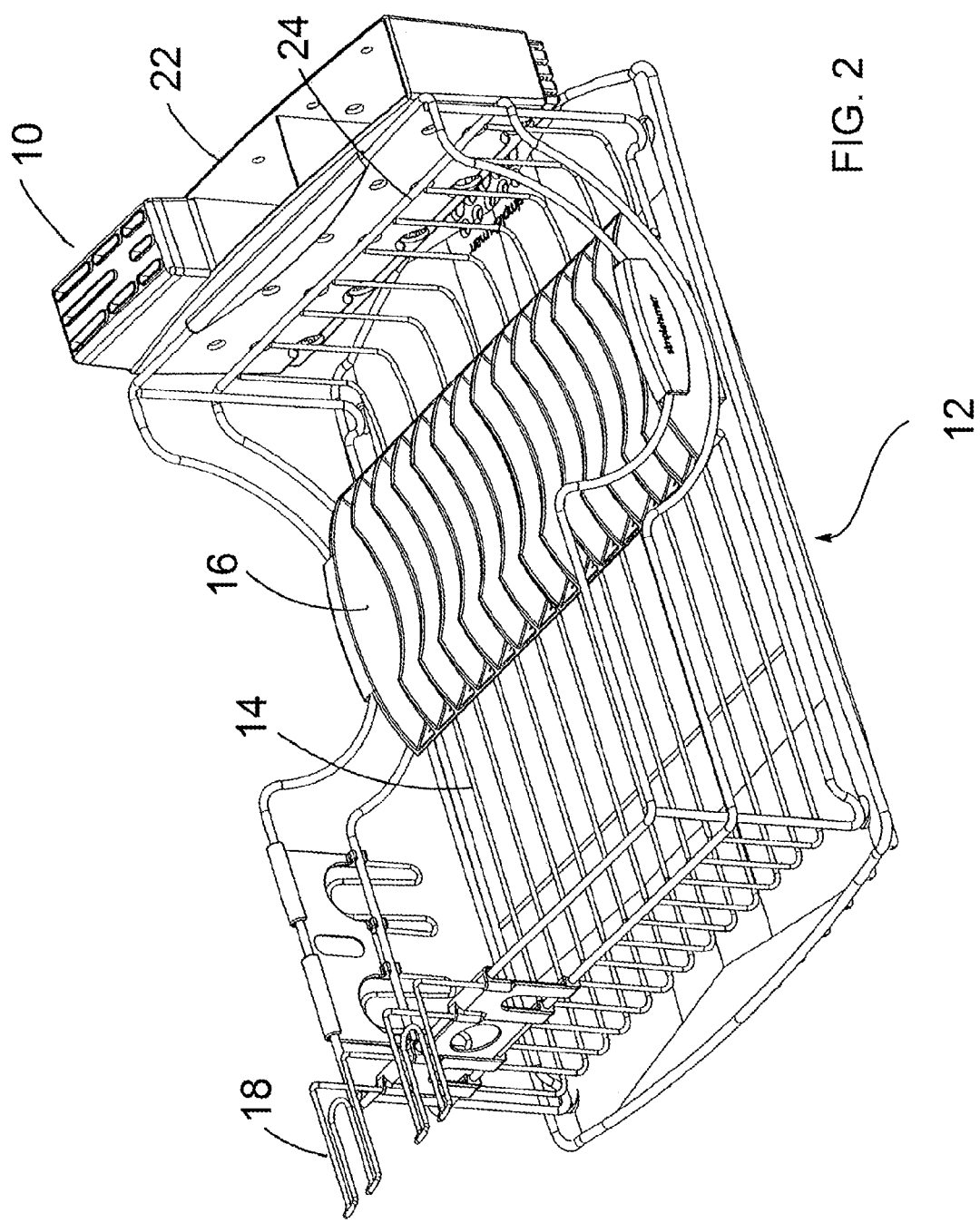
FIG. 2 is a perspective view of the collector tray and retainer block of FIG. 1 shown in use with a conventional dish rack.

FIGS. 1-2 and 4-5B illustrate one retainer block 10 according to the present invention. The retainer block 10 is adapted to be used with any conventional dish rack that has a collector tray. Alternatively, the retainer block 10 can be clipped (or otherwise removably secured) directly on to a conventional dish rack. FIGS. 1-2 illustrate a dish rack 12 that has a novel design, but the retainer block 10 can be used with any conventional dish rack as well. The dish rack 12 can have the typical components of a conventional dish rack, including, but not limited to, a wire frame base 14 for receiving plates and large bowls, a divider section 16 that has a plurality of divider walls for receiving plates, extending holders 18 for holding drinking glasses or wine glasses, and a collector tray 22 that is suspended along an end edge 24 of the dish rack 12.

Figure 3:
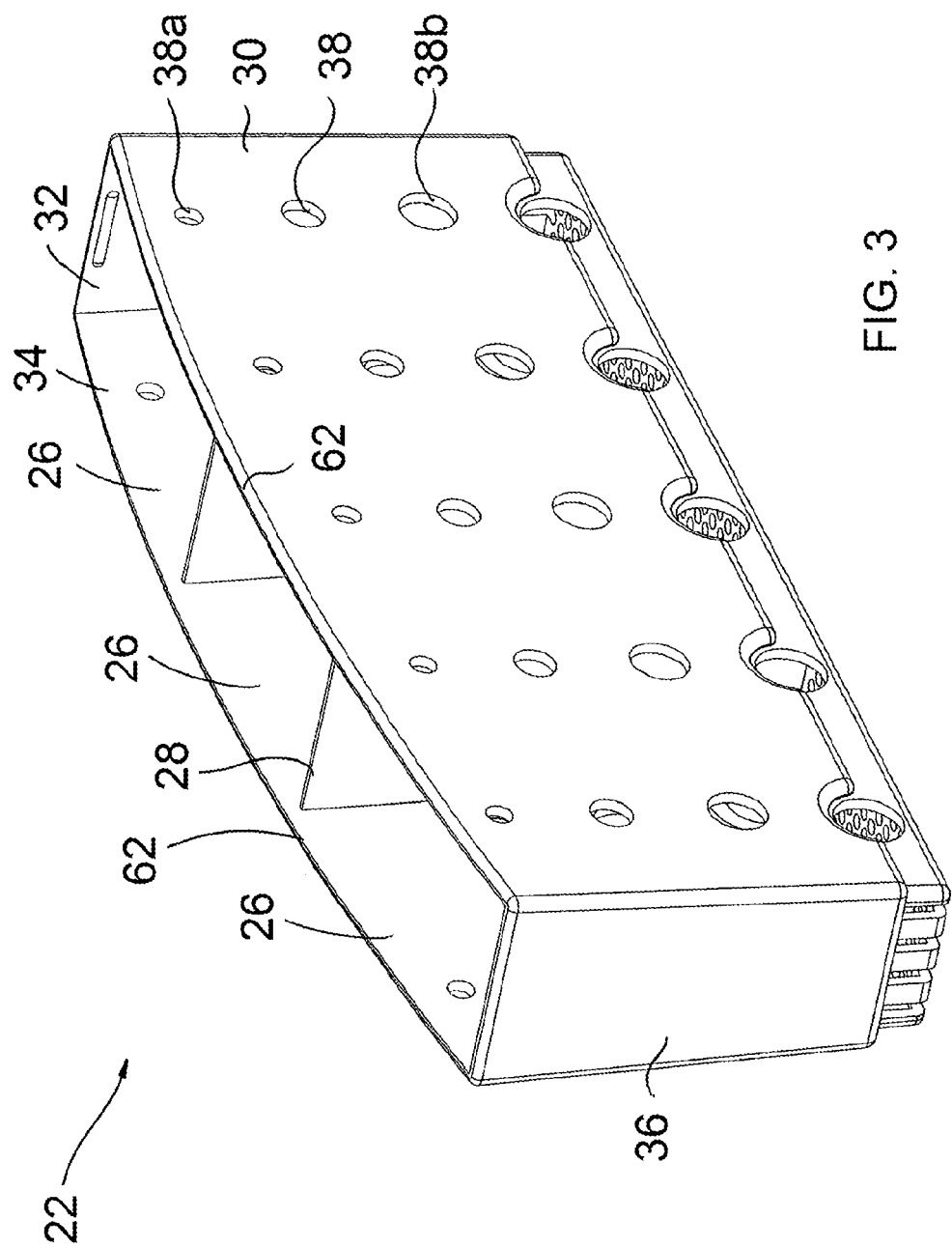
FIG. 3 is a perspective view of the collector tray of FIG. 1.

The collector tray 22 can be made from a flexible yet strong material (such as plastic), and has four side walls 30, 32, 34, 36 that a define an interior which is divided into a plurality (e.g., three as shown in FIGS. 1-3) of open-top compartments 26 by dividing walls 28. A plurality of openings 38 can be provided in any or all of the side walls 30, 32, 34, 36. Some of these openings 38 (e.g., 38a) that are provided adjacent the top edges of the side walls 30, 32, 34, 36 function to receive a locking notch 40 of the retainer block 10, as explained below. Other openings 38 (e.g., 38b) that are provided away from the top edges of the side walls 30, 32, 34, 36 function to allow air to be circulated through them. As best shown in FIG. 1, the retainer block 10 according to the present invention is received inside one of these open-top compartments 26, and positioned at the top of the compartment 26.

Figure 4:
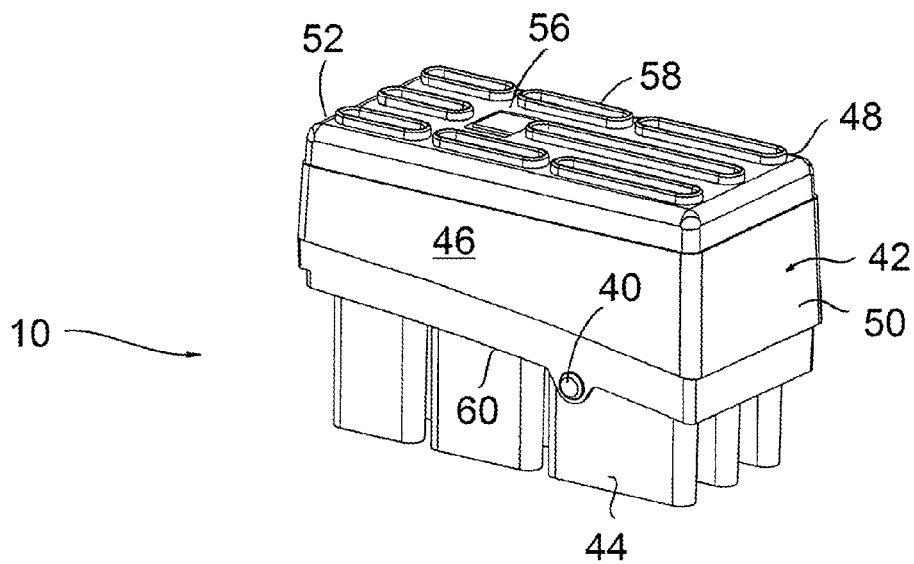
FIG. 4 is a perspective view of the retainer block of FIG. 1.

The retainer block 10 is illustrated in greater detail in FIGS. 4 and 6. The retainer block 10 has a shell 42 and a plurality of elongated holders 44 positioned vertically inside the shell 42. The shell 42 has two elongated side walls 46 and 48, and two end walls 50 and 52 extending between, and connecting, the side walls 46, 48. The walls 46, 48, 50, 52 define an empty interior space. A notch 40 can be provided adjacent the bottom edge 60 of each side wall 46, 48.

A top wall 56 extends over the top edge of each of the walls 46, 48, 50, 52 to cover the interior space 54. A plurality of elongated slots are provided in the top wall 56. Each slot is defined by an elongated flange 58 that extends from the top wall 56. Each holder 44 is a generally tubular body that has an elongated cross-section that is generally rectangular, elliptical or rectangular with rounded or curved ends. Each holder 44 extends from a flange 58 in the top wall 56 through the interior space 54 and out beyond the opened bottom end of the shell 42. Each holder 44 and its flange 58 can be provided with the same cross-sectional shape and can be made in one piece. Each holder 44 (and its corresponding slot and flange 58) is adapted to receive a separate knife in the manner described below, and can be provided in different cross-sectional widths to accommodate knives of different widths (see the different widths for the flanges 58 in FIG. 4).

Figures 5A, 5B:
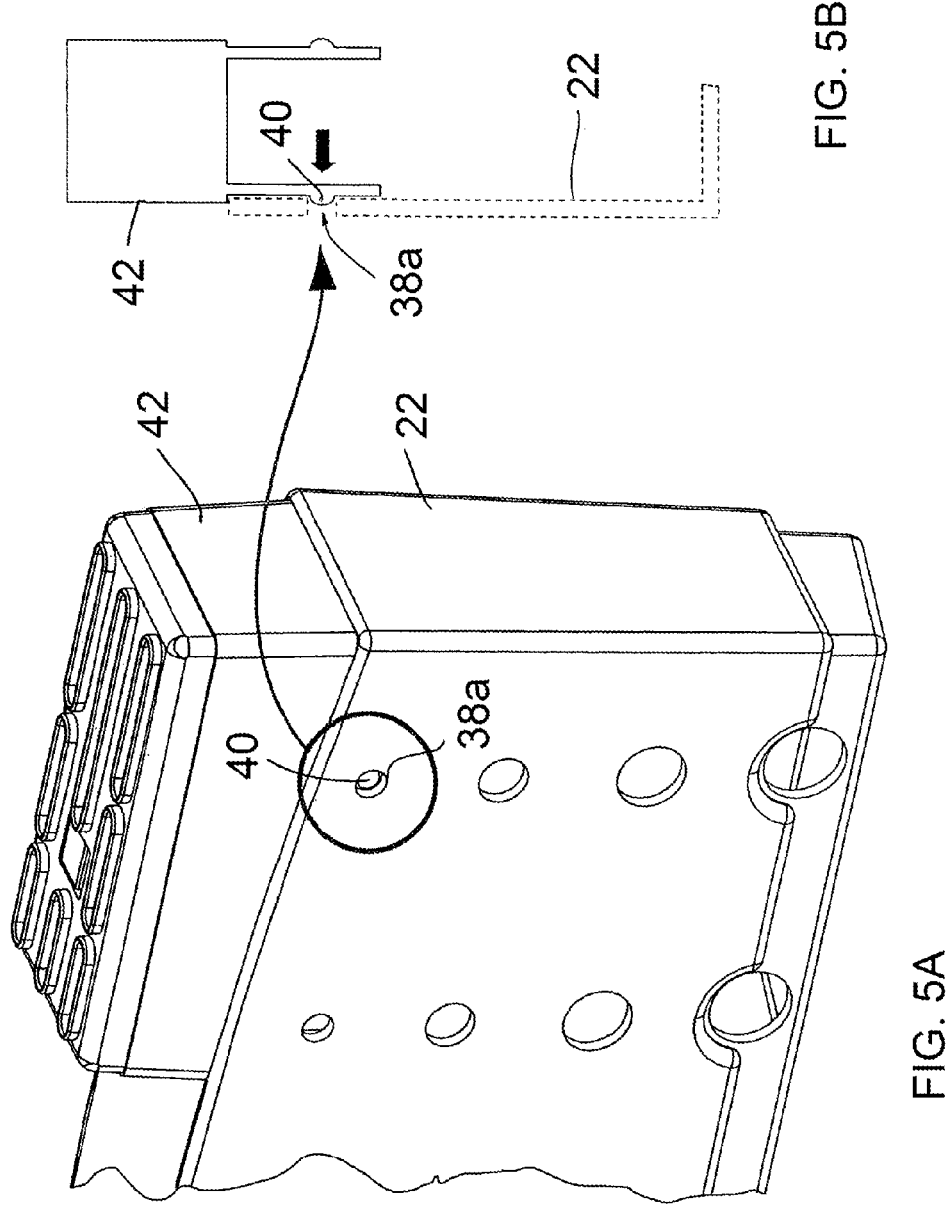
FIG. 5A is an enlarged perspective view of a portion of the collector tray and retainer block of FIG. 1.
FIG. 5B is a cross-sectional view of the collector tray and retainer block of FIG. 1.

The retainer block 10 can be used in the following manner. As best shown in FIGS. 1, 5A and 5B, the retainer block 10 can be placed over either end compartment 26 of the collector tray 22, with the opposing notches 40 fitted inside corresponding openings 38a on the opposing side walls 46 and 48. Notches 40 and the openings 38a are optional, and can be omitted, with the retainer block 10 seated inside an end compartment 26. The flexible nature of the side walls 46, 48 allows them to be flexed slightly so that the notches 40 can be pushed through the interior space of the compartment 26 and into the openings 38a. FIG. 1 illustrates the retainer block 10 seated in one of the end compartments 26. The bottom edge 60 of the side walls 46, 48 can be provided with a shape that allows the bottom edges 60 to be aligned with the top edges 62 of the side walls 30 and 34 of the collector tray 22. For example, the top edges 62 of the side walls 30, 34 are illustrated as being slightly convex, and the bottom edges 60 of the side walls 46, 48 are illustrated as being slightly concave, to provide for a snug and aligned fit of the retainer block 10 in one of the end compartments 26. With the shell 42 extending upwardly from the collector tray 22, the user can insert the blade(s) of one or more knives through any selected slot (via the corresponding flange 58) into a holder 44. Thus, the blades of the knives will be retained inside, and completely shielded by, the holders 44, with only the handles of the knives extending outwardly from the shell 42. This positioning of the knives (i.e., shielding of the blades by the top wall 56 of the shell 42) will ensure that the user will not be able to grip or contact the blades of the knives when removing the knives from the dish rack 12. A knife can be inserted into or removed from a holder by a straight up-down action, thereby minimizing blunting of the blades because the blade is always retained inside the holder 44 without contacting any part of the inner walls of the holder 44. Although the retainer block 10 is illustrated herein as being for use with knives, it can also be used to accommodate any sharp objects.

To remove the retainer block 10 from one of the compartments 26, the user merely lifts the retainer block 10, causing the opposing notches 40 to be disengaged from each corresponding opening 38a. The flexible nature of the side walls 46, 48 allows them to be flexed slightly so that the notches 40 can be pushed through the interior space of the compartment 26 and back out through the top edges 62.

Thus, the retainer block 10 according to the present invention allows the user to use it for retaining sharp objects. The raised shell 42 of the retainer block 10 provides an effective shield against the sharp edges or blades of the knife or other object retained in the retainer block 10.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A utensil holding apparatus for use with a drying dish rack, comprising:
    a collector tray, wherein the collector tray has at least one compartment, wherein the compartment includes sidewalls defining an interior, and wherein the shell is removably coupled to sidewalls of the compartment; and
    a retainer block comprising a shell fitting over the compartment of the collector tray, wherein the shell has a top wall with a plurality of elongated slots provided in the top wall, and a plurality of elongated holders depending from the slots in the top wall, wherein the shell further includes sidewalls depending from the top wall, which sidewalls define an interior space in which the elongated holders extend, and wherein the elongated holders extend beyond the sidewalls of the shell, such that when the shell is fitted over and coupled to the sidewalls of the compartment, the elongated holders extend into the interior of the compartment.

2. The utensil holding apparatus of claim 1, wherein the shell is removably coupled to the sidewalls of the compartment by means of a complementary notch and opening structure between the sidewalls of the compartment and the sidewalls of the shell.

3. The utensil holding apparatus of claim 1, wherein the compartment is provided with drainage holes for water dripped into the compartment.

4. The utensil holding apparatus of claim 3, wherein the sidewalls of the compartment are provided with holes to facilitate air drying wet articles held in the compartment.

5. The utensil holding apparatus of claim 1, wherein the collector tray has at least one dividing wall that divides the collector tray into a plurality of compartments.

6. The utensil holding apparatus of claim 5, wherein at least one of the plurality of compartments is free of the retainer block.

7. The utensil holding apparatus of claim 5, wherein the shell is removably coupled to the sidewalls of the compartment by means of a complementary notch and opening structure between the sidewalls of the compartment and the sidewalls of the shell.

8. A dish rack assembly, comprising:
    a dish rack having an interior area for holding articles for drying, wherein the dish rack comprises a wire frame defining the interior area;
    a utensil holding apparatus supported by the dish rack, the utensil holding apparatus comprising:
        a collector tray, wherein the collector tray has at least one compartment, wherein the compartment includes sidewalls defining an interior, wherein the shell is removably coupled to sidewalls of the compartment, and wherein the shell includes sidewalls depending from the top wall, which sidewalls define an interior space in which the elongated holders extend; and
        a retainer block comprising a shell fitting over the compartment of the collector tray, wherein the shell has a top wall with a plurality of elongated slots provided in the top wall, and a plurality of elongated holders depending from the slots in the top wall, wherein the elongated holders extend beyond the sidewalls of the shell, such that when the shell is fitted over and coupled to the sidewalls of the compartment, the elongated holders extend into the interior of the compartment.

9. A dish rack assembly of claim 8, wherein the apparatus is supported outside the interior area by the wire frame.

10. The dish rack assembly of claim 8, wherein the shell is removably coupled to the sidewalls of the compartment by means of a complementary notch and opening structure between the sidewalls of the compartment and the sidewalls of the shell.

11. The dish rack assembly of claim 8, wherein the sidewalls of the compartment are provided with holes to facilitate air drying wet articles held in the compartment.

* * * * *